United States Patent [19]
Chaco

[11] Patent Number: 6,009,333
[45] Date of Patent: Dec. 28, 1999

[54] TELEPHONE COMMUNICATION SYSTEM HAVING A LOCATOR AND A SCHEDULING FACILITY

[75] Inventor: John Chaco, Seymour, Conn.

[73] Assignee: Executone Information Systems, Inc., Milford, Conn.

[21] Appl. No.: 08/909,318

[22] Filed: Aug. 14, 1997

[51] Int. Cl.$^6$ .............................. H04Q 7/20; H04M 3/42; G08B 5/22

[52] U.S. Cl. .......................... 455/456; 455/414; 455/426; 379/201; 340/825.49; 340/825.36; 340/572

[58] Field of Search .................................. 455/456, 414, 455/419, 426, 457, 458, 519, 518, 556, 558, 575, 550; 379/201, 198, 211, 38, 88.12; 340/825.49, 825.44, 311.1, 825.54, 825.47, 825.36, 573, 572, 506

[56] References Cited

U.S. PATENT DOCUMENTS

| | | | |
|---|---|---|---|
| 4,626,836 | 12/1986 | Curtis et al. | 340/706 |
| 5,465,082 | 11/1995 | Chaco | 340/825.54 |
| 5,493,692 | 2/1996 | Theimer et al. | 455/26.1 |
| 5,515,426 | 5/1996 | Yacenda et al. | 379/201 |
| 5,689,229 | 11/1997 | Chaco et al. | 340/573 |
| 5,822,418 | 10/1998 | Yacenda et al. | 379/201 |

FOREIGN PATENT DOCUMENTS

| | | |
|---|---|---|
| 0399520 | 11/1990 | European Pat. Off. . |
| 0781067 | 6/1997 | European Pat. Off. . |
| 2193359 | 2/1988 | United Kingdom . |
| 95/01617 | 1/1995 | WIPO . |
| 97/20423 | 6/1997 | WIPO . |

*Primary Examiner*—Dwayne D. Bost
*Assistant Examiner*—Tracy M. Legree
*Attorney, Agent, or Firm*—Dilworth & Barrese

[57] ABSTRACT

A telephone communication system having a locator and a scheduling facility includes: a PBX connected to telephones for facilitating communication between users; a scheduling unit for storing user schedule information for the users; and a locator system for providing location information. The locator system includes portable units associated with respective users which transmits an identification signal for identifying the user. The portable units include portable computing devices for interactively processing scheduling information with the scheduling unit. Transceivers receive the unit information from the portable units for forwarding the unit information to the PBX to determine location information of the users. The PBX activates telephone functions for use in conjunction with the location information for communicating with a called user, and the PBX accesses the user schedule information of a first user, for retrieving a specific location associated with the first user for generating a schedule notification message for communication to the first user at the specific location thereof.

22 Claims, 10 Drawing Sheets

FIG. 13 of the present invention;

TELEPHONE COMMUNICATION SYSTEM HAVING A LOCATOR AND A SCHEDULING FACILITY

FIELD OF THE INVENTION

The present invention generally relates to a telephone communication system and more particularly a telephone communication system connected to a locator system for locating telephone users, and for providing a scheduling system operating in conjunction with the locator system.

BACKGROUND OF THE INVENTION

Location systems for locating objects or personnel within a facility and their use in conjunction with telephone systems have previously been proposed. Typically, location systems locate personnel or objects by seeking out where the objects or personnel are closest to designated monitors, using portable units worn or attached to objects or personnel to be located. Each portable unit is assigned a unique identification. Location systems employing such location techniques are described, for example, in U.S. Pat. No. 5,515,426 to Yacenda et al. and U.S. Pat. No. 5,465,082 to Chaco. In addition, such prior art location systems have also been combined with telephone systems for facilitating location of and communications between personnel in a facility.

Scheduling systems distributed among a plurality of users have heretofore been limited to wired networks between generally fixed location terminals, such as the system described in U.S. Pat. No. 4,626,836 to Curtis et al.

The use of scheduling systems in conjunction with locator systems has heretofore usually been in the form of providing scheduling features which allow scheduling information to be centrally stored and sent to respective users; for example, U.S. Pat. No. 5,493,692 to Theimer et al. provides a locator system with badges and other portable devices which allow a user to be located as well as to schedule events.

Such schedule and locator systems have heretofore delivered messages or schedule information to users with little or no security; for example, the prior art schedule and locator systems may purposely select an available device in the proximity of the recipient with little or no control of the recipient.

Therefore, a need exists for a scheduling and locator system with improved processing of messages to the appropriate recipients and with greater control of reception by the recipient.

Further, mobile wireless devices of the prior art have either been rudimentary input devices or have been limited in features. Recent improvements and developments in user interfaces have not been adapted in such scheduling and locator systems to provide ease of use in conjunction with greater functionality.

Therefore, a need exists for a telephone/locator system which provides advanced features with an improved user interface to address the above problems and to facilitate interaction and control of the system by the users.

SUMMARY OF THE INVENTION

A telephone communication system having a locator and a scheduling facility is provided, which includes: a private branch exchange (PBX) having a processing unit and a plurality of telephones for facilitating telephone communication between a plurality of users; a scheduling unit, operatively connected to the processing unit, for storing user schedule information for each of the plurality of users; and a locator system connected to the PBX for providing location information.

The locator system includes a set of portable units each associated with a respective one of a plurality of users and transmits unit information including an identification signal for identifying the user associated with the respective unit, the set of portable units including a set of portable computing devices for interactively processing scheduling information with the scheduling unit; and a plurality of transceivers, each operatively connected to the PBX and each adapted for receiving the unit information transmitted from the set of portable units and for electrically forwarding at least a portion of the unit information to the processing unit of the PBX to determine location information of the users.

The PBX also includes means for selectively activating one of a plurality of telephone functions for use in conjunction with the location information for communicating with a called user; and schedule notification means for accessing the user schedule information of a first user, for retrieving location information including a specific location associated with the first user using the means for selectively accessing, and for generating a schedule notification message for communication to the first user at the specific location thereof.

In an additional embodiment, the PBX include means for transmitting wireless signals to paging devices worn or carried by a specific user. The paging device will aid in locating the individual in the event they travel beyond the range of the transceivers. The incorporated paging system will also provide schedule notification messages directly to the specific user without requiring additional user intervention.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS SYSTEM CONFIGURATION

Figure 1:
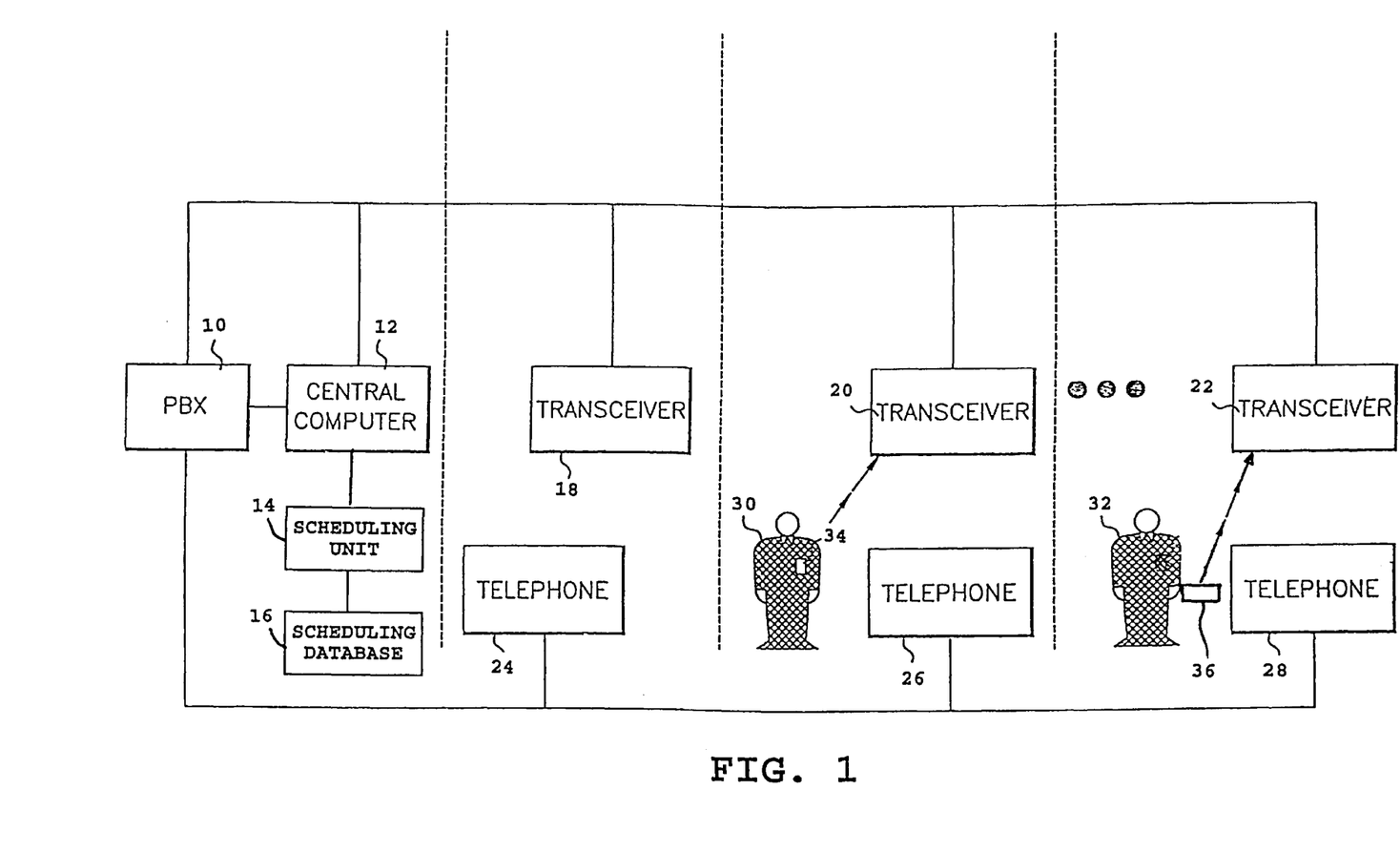
FIG. 1 illustrates the system configuration for the telephone communication system of the present invention.

As shown in an illustrative embodiment in FIG. 1, a telephone communication system and method of use are disclosed, which includes a private branch exchange (PBX) 10 having and/or operatively connected to a central computer 12; a scheduling unit 14 having and/or operatively connected to a scheduling database 16 for storing user schedule information; and a locator system having a plurality of transceivers 18–22, connected to the PBX 10 for providing location information thereto, as described in greater detail below.

The PBX 10 has a processing unit (not shown) and a plurality of telephones 24–28 for facilitating telephone communication between a plurality of users 30–32. The PBX 10 also includes means for selectively accessing the locator system for retrieving the location information, with the means for selectively accessing being accessible from any selected one of the telephones 24–28 through the PBX 10. The PBX 10 also includes means for communicating the location information to the selected one of the telephones 24–28; and the PBX 10 includes means for selectively activating one of a plurality of telephone functions for use in conjunction with the location information for communicating with a called user. In addition, the PBX 10 includes schedule notification means for accessing the user schedule information of a first user stored in the scheduling database 16 and for retrieving location information including a specific location associated with the first user using the means for selectively accessing, and for generating a schedule notification message for communication to the first user at the specific location thereof. The means provided in the PBX 10 may be, but not limited to, software executed by the processing unit of the PBX 10.

The locator system includes a set of portable units 34, 36 which interact with the plurality of transceivers 18–22. Each of the set of portable units 34, 36 is associated with a respective one of a plurality of users 30, 32 and transmits unit information including an identification signal for identifying the user associated with the respective unit. The portable units may be identification badges and/or may be portable computing devices for interactively processing scheduling information with the scheduling unit 14.

Each of the plurality of transceivers 18–22 is operatively connected to the PBX 10 and is adapted for receiving the unit information transmitted from the set of portable units 34, 36 and for electrically forwarding at least a portion of the unit information to the processing unit of the PBX 10 to determine location information of the users 30, 32.

The plurality of transceivers 18–22 may include a wireless receiver/sensor adapted to receive radiated energy from a remote transmitting device associated with the portable units 34, 36. Preferably, such a receiver/sensor is adapted to receive infrared signals from the remote transmitter.

Each user 30, 32 in the facility is provided with at least one portable unit, such as badge 34 and/or pad 36, each of which includes a remote transmitting device for periodically transmitting predetermined personnel information. For the purposes of clarity in the present detailed description, the personnel information transmitted by each portable unit 34, 36 is identified as unit data or unit information, and information transmitted to the portable units is identified as return unit data. Each of transceivers 18–22 is capable of receiving the unit data when the remote transmitting devices are in the reception range of a corresponding transceiver. The transceivers 18–22 detect, digitize and optionally may process the received radiated energy, and transfer the processed information to the central computer 12 or, alternatively, directly to the PBX 10. The PBX 10 may then, for example, utilize the information to re-direct incoming calls for each particular user to their detected location, as noted above.

The PBX 10 is connected to the central computer 12 to couple the central computer 12 to the telephones 24–28 located in the facility. The central computer 12 provides for standard control of the PBX 10 such as the processing of telephone data received by the PBX 10, as well as providing the PBX 10 with the connection information to interconnect particular telephones. For example, if a user (herein "the calling party") calls another extension connected to the PBX 10, the central computer 12 processes the telephone data, for example, the extension of the called party, and provides the PBX 10 with the necessary information to interconnect the two telephones. In addition the central computer 12 is utilized to process the information received from the remote portable units, such as the determining of the identity of the telephone user associated with the respective portable unit.

The central computer 12 may also be utilized to update the display of the telephone of the calling party with the location information of the called party. Alternatively, the components and functions of the central computer 12 may be incorporated within the PBX 10, and all the functions of central computer 12 may be performed by the PBX 10. The PBX 10 includes a processing unit (not shown), stored programs and means for facilitating telephone functions such as special ring tones, callback, caller ID, call blocking, do not disturb, call forwarding, camp-on, voice-mail, etc. Implementation of these functions are known to one skilled in the telephone art. Preferably, the PBX 10 is a model IDS-228, commercially available from "EXECUTONE" Information Systems, Inc.

In an additional embodiment, each user is provided with a paging device 33, and a wireless transmitter 17 is connected to PBX 10 and central computer 12. Wireless transmitter 17 includes an antenna 19 for sending wireless signals to paging devices 33. Paging devices 33 can be used with both the locator and scheduling notification systems disclosed herein.

When central computer 12 is attempting to locate user 30, there exists a possibility that user 30 is not within the range of transceivers 18–22, in which case, user 30 cannot be located. Upon initiation of a location operation, or after a failed location operation attempt, computer 12 can provide transmitter 17 with a signal instruction to transmit a paging signal for the paging device 33 being worn by the specific user. The paging signal can be numeric or alphanumeric, and will provide user 30 with notice that someone is trying to locate them. Subsequently, user 30 can go to the nearest telephone 24–28 and speak to the person(s) trying to locate them.

Transmitter 17 can be, for example, a radio frequency (RF), Infrared (IR), ultra high frequency (UHF) or any other suitable known transmitter capable of selectively transmitting a wireless signal to a particular paging device. Transmitter 17, under control of computer 12, can transmit a paging signal to any one or more of pagers 33 via a plurality of selectable frequencies within a desired operating frequency range.

Central computer 12 can transmit a paging signal to pager 33 that instructs user 30 to go to the nearest telephone and dial a specific code or extension to access the person locating them. As described previously, computer 12 controls PBX 10 and can selectively interconnect particular telephones. As such, computer 12 can automatically interconnect the paged user 30 with the calling party by when user 30 dials the specific code or extension provided via the paging signal.

In a further embodiment, computer 12 will send scheduling notification messages directly to user 30 via pager 33.

User 30 can then selectively access additional scheduling information from scheduling unit 14 and database 16. Thus, the addition of a pager 33 for each user further aids in the location and scheduling notification systems.

Figure 2:
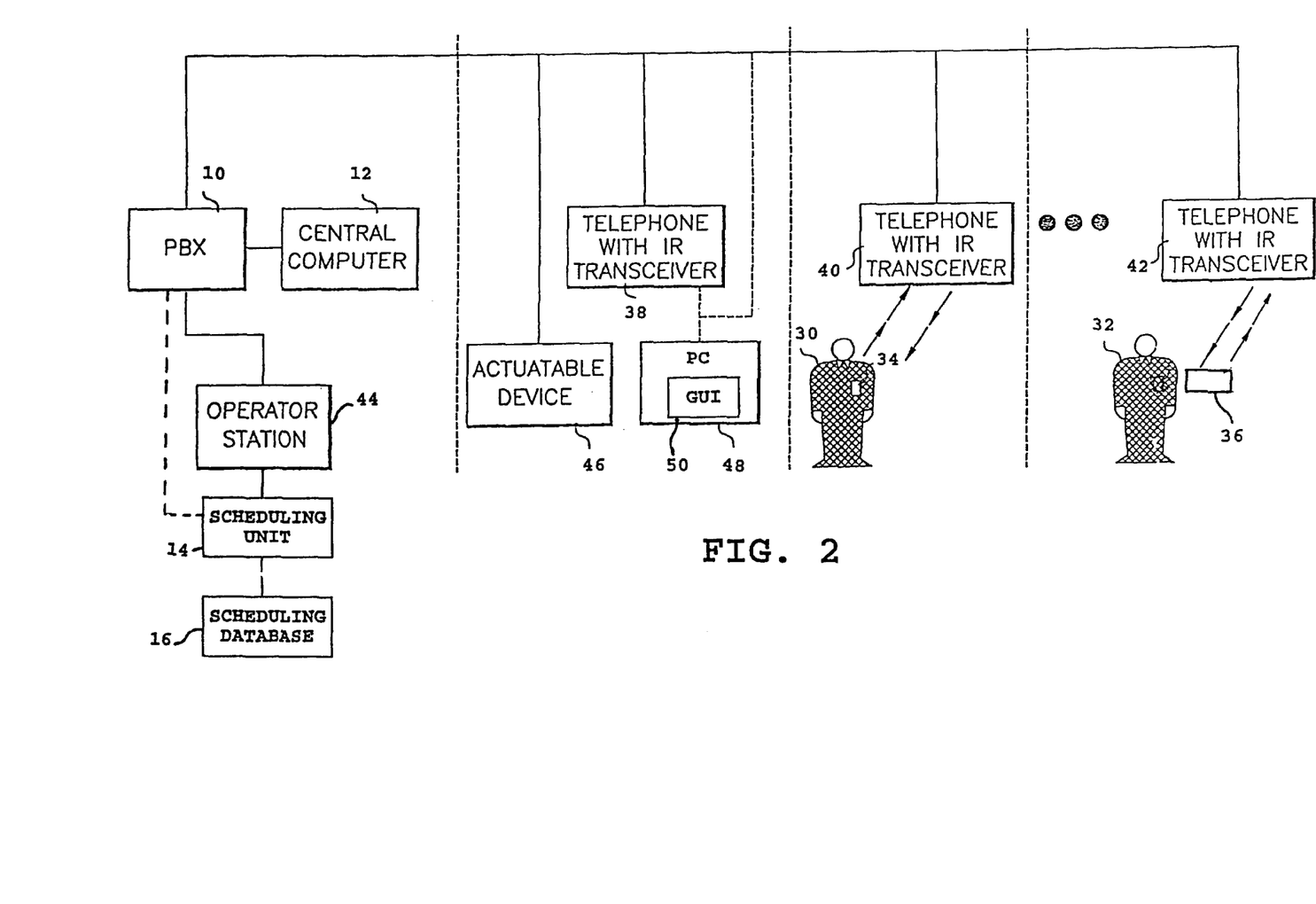
FIG. 2 illustrates an alternative system configuration for the telephone locator system of the present invention.
Figure 3:
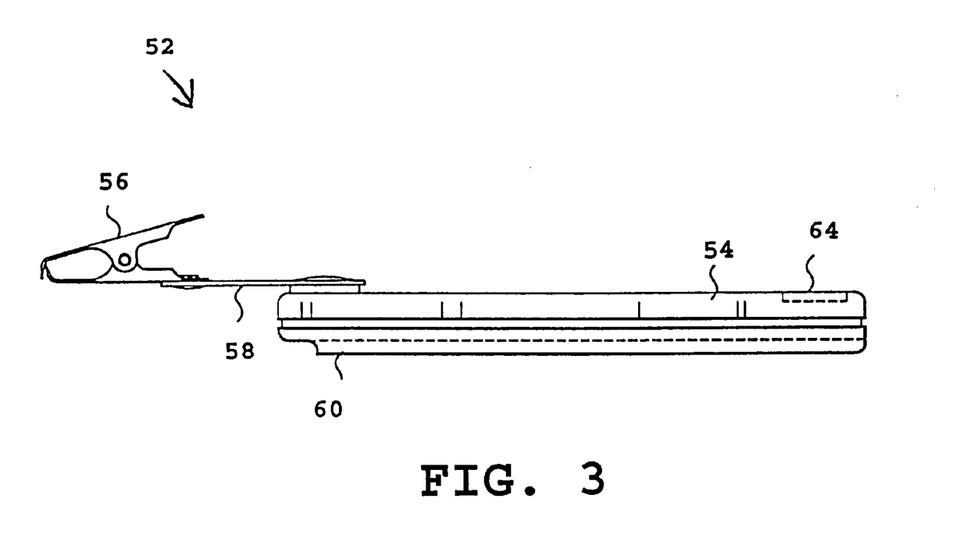
FIG. 3 illustrates a side elevational view of the housing of an exemplary badge unit according to the present invention.

In an alternative embodiment as shown in FIG. 2, a portion of the transceivers may be incorporated into respective telephones; i.e. the locator system includes telephone units 38–42, with each of the telephone units 38–42 associated with a respective telephone user 30, 32, and with each telephone unit 38–42 including telephone circuitry as well as a transceiver such as a wireless sensor for receiving wireless transmissions from the portable units 34, 36. The unit information may then be relayed by the telephone circuitry associated with a respective transceiver to the PBX 10 through the existing telephone to PBX connections.

In a further alternative embodiment, each telephone unit 38–42 includes a wireless transmitter and each portable unit 34, 36 includes a wireless receiver to facilitate bi-directional wireless communication between the telephone units 38–42 and the portable units 34, 36. The signals from the portable units 34, 36 received by the telephones units 38–42 include user information, such as the identification information of the remote portable units 34, 36 associated with each user. Each of the telephone units 38–42 preferably includes a display for displaying the location of the called person. If the called person is moving from one location to another and the telephone connection remains connected, the locations of the called person may be updated substantially continuously on the display, so as to enable the caller to track the locations of the called person.

An operator station 44, an actuatable device 46, and a personal computer (PC) 48 are also shown in FIG. 2 to be connected to the PBX 10. The operator station 44 may be used, for example, by a supervisor to perform operator functions such as connecting and monitoring incoming calls to the users 30, 34 of the facility. According to the present invention, the operator station 44 may be connected to the scheduling unit 14, and includes a display for displaying, on demand or on a continuously updated basis, the locations of the users 30, 32, the schedules of the users 30, 32 stored in the scheduling database 16, and also for identifying the persons located at specified telephone extensions. In the illustrative embodiment shown in FIG. 2, the scheduling unit 14 is connected to the PBX 10 through the operator station 44. Alternatively, the scheduling unit 14 may optionally having a direct connection to the PBX 10, as shown in FIG. 2.

The actuatable device 46 may be a mechanical or electrical device, for example, a thermostat or a door lock which may be remotely controlled by commands from the PBX 10. The PC 48 may include a graphic user interface (GUI) 50, and may be used by a user to communicate with the PBX 10 to access function modules, such as described in U.S. Appln. No. 08/586,557, incorporated herein.

The PC 48, which may be a portable computing device such as a laptop or a personal digital assistant (PDA), may be linked to the PBX 10, either directly or through the telephone 38, for permitting users without pads 36 such as users 30 with badges 34 to enter, for example, scheduling data to the scheduling unit 14 for storage in the scheduling database 16.

REMOTE TRANSMITTING DEVICES

As shown in FIGS. 3–8, examples of suitable transmitting/receiving devices are provided to function as the portable units 34, 36, as shown in FIGS. 1–2. As shown in FIGS. 3–7, one illustrative embodiment of a portable unit is a badge unit 52 having associated electronics enclosed in a housing 54. Generally, the housing 54 is shaped and sized like an ordinary credit card and includes clip 56 which is secured thereto via a resilient band 58, so the badge unit 52 may be worn by personnel, for example, on the outer clothing of the personnel and suitably and prominently displayed for security and identification purposes. Preferably, the housing 54 is approximately 3.8 inches (9.65 cm.) in length, 2.27 inches (5.77 cm) in width, and 0.39 inches (1 cm.) in thickness, and includes slots 60, 62 for slidably receiving and maintaining a personnel identification (ID) card or a smart card.

Electronic circuitry is disposed in the housing 54 for providing a keypad 64 and a GUI 66, such as a display and/or a mouse or touchpad, for receiving user inputs and for displaying information; and a sensor and/or transmitter 68 for sending and receiving, for example, infrared radiation to provide a communication path between the badge unit 52 and a transceiver, such as the transceiver 40 in FIG. 2. A speaker and/or microphone 70 may also be included to provide for audio communications to and from the user, for example, to conduct telephone conversations relayed to the badge unit 52 from the PBX 10 through, for example, the transceiver 40 in FIG. 2.

The electronics in the housing 54 include a card switch (not shown in FIGS. 3–7) which is positioned within slots 60, 62 so that, when the personnel card is inserted into slots 60, 62 of the housing 54, the personnel card is operatively coupled to the card switch and closes the card switch, which sets the electronics to be in an interactive operational mode to be interactive with the personnel card and/or with the disclosed telephone communication system. Conversely, removal of the personnel card may open the card switch to set the electronics in an idle or dormant operational mode or to deactivate the electronics of the badge unit 52.

The personnel card may be an ordinary business card, a smart card having electronically stored information, or like members or devices which may include a pre-arranged mark pattern. When coupled to the housing 54, such smart cards or members having a pre-arranged mark pattern produce data which may represent data stored on the smart card or mark pattern; for example, such data may be used to generate canned messages.

Figure 5:
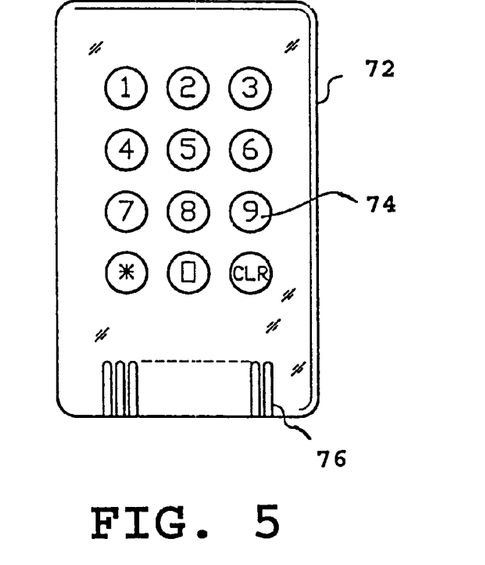
FIGS. 5–6 illustrate front and side elevational views of a function card according to the present invention.
Figure 6:
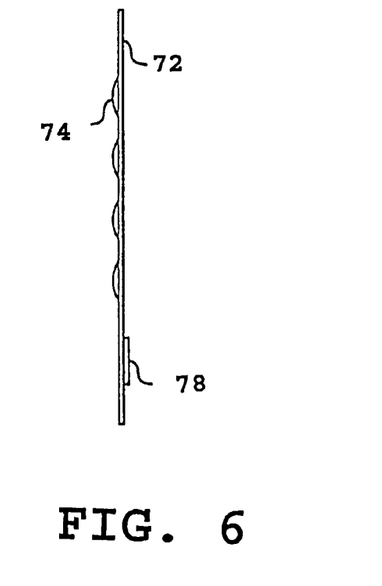

An illustrative embodiment of such a smart card as a function card 72 is shown in FIG. 5, in which the function card 72 may be a device having a plurality of function keys arranged thereon, for example, in a standard keypad matrix 74. The keypad matrix 74 and associated electronics housed within the function card 72 are coupled to an edge connector 76. At least one predetermined data generator 78, such as a serial number generator, is coupled to the keypad matrix 74 such that, upon pressing the appropriate function key or sequence of function keys, preassigned data is output to the edge connector 76. The predetermined data generator 78 may include a number, which may be up to 48 bits, embedded in a silicon-based semiconductor. The predetermined data generator 78 is connected to a high voltage level and ground to create the 1 and 0 data bits. The predetermined data may be prearranged to represent an identification number, a password, or canned messages. The data output at the edge connector 76 is transferred to a microcontroller of badge unit 52, such as described in U.S. Appln. No. 08/586, 557, incorporated herein. An example of a suitable predetermined data generator is the model DS2400 silicon serial number manufactured by DALLAS Semiconductor.

Figure 7:
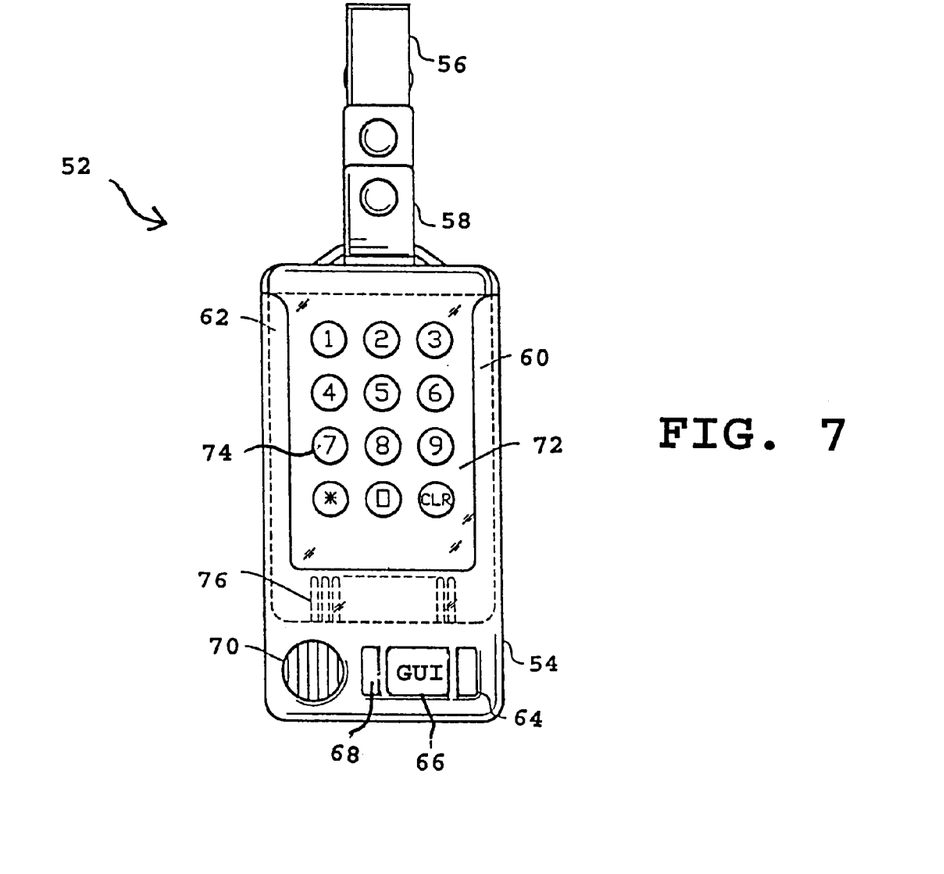
FIG. 7 illustrates a top plan view of the housing of FIG. 4 having a function card inserted therein.

The function card 72 may be in a streamline configuration for insertion within slots 60, 62 of the badge unit 52, as shown in FIG. 7. In the illustrative embodiment in FIG. 7, the function card 72 is coupled to the microcontroller of the via the edge connector 76, as shown in phantom in FIG. 7. The edge connector 76 is positioned within the slots 60, 62 of the housing 54, as shown in phantom in FIG. 7, so as to engage the electronics of the badge unit 52 when the function card 72 is inserted in the slots 60, 62.

In such an engagement, the function card 72 is coupled to the microcontroller of the electronics of the badge unit 72, and is provided to activate predefined functions from predefined commands to be performed by the microcontroller. For example, an individual may initiate a locator function (described hereinbelow) from the badge unit 52 by pressing a single function key or a sequence of function keys, which define a command signal. The command signal is transferred to the microcontroller which reconfigures the command signal and transmits corresponding badge data to a telephone IR receiver or to transceiver, such as transceiver 40.

In an illustrative embodiment, the telephone IR transceiver 40 then transfers the badge data to the PBX 10 and/or central computer 12 to activate the selected function. Preferably, the functions keys may be used to define custom instructions specific to the user. For example, the badge user may enter a password and define specific conditions to be met before a call is transferred to the extension of the user from the locator system. In another example, the function key may cause the microcontroller to transmit a preassigned and/or canned message to perform a specific function, such as to change the voice mail function to the secretary tracking function. Such functions are described in more detail in commonly assigned U.S. Pat. No. 5,515,426, and commonly assigned co-pending U.S. patent application No. 08/586, 557, filed Jan. 16, 1996 and entitled TELEPHONE COMMUNICATION SYSTEM HAVING A LOCATOR, both disclosures being incorporated herein by reference.

The keypad 64 and/or GUI 66 of the badge unit 52 facilitate manual communication and data entry to the microcontroller so that a user may select desired operational functions, such as mode select or transmission of a preselected message. The function selected is dependant upon the number and sequence of button pushes. The modes of operation are described in greater detail in U.S. Appln. No. 08/586,557, incorporated herein. It is understood that any information to be displayed may be provided by the GUI 66 for display to the user to display the operational functions selected by the user using the keypad 64 and/or the GUI 66. The speaker 70 and associated voice circuitry are provided to broadcast audio messages, for example, messages received from the central computer 12. The voice circuitry translates digital signals received through the sensor 68 and processed by the microcontroller to audio signals which excite the speaker 70.

Figure 8:
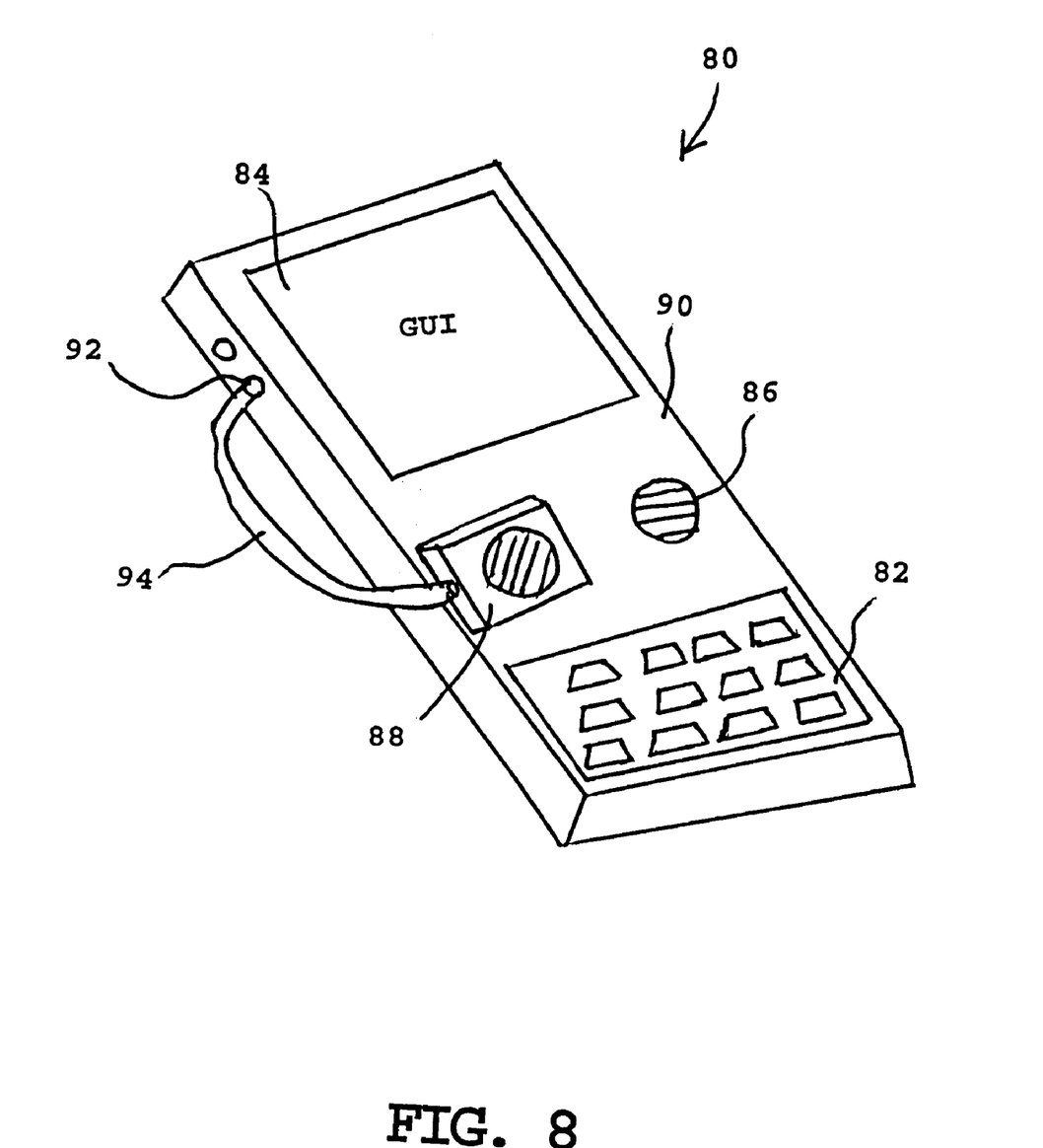
FIG. 8 illustrates a perspective view of a pad device according to the present invention.

The pad 36 shown in FIGS. 1–2 may be a personal digital assistant (PDA) and/or a hand-held personal computer (HPC), such as the pad device 74 shown in FIG. 8, implementing PDA/HPC features known in the art; for example, the pad device 74 may include an R4000 series microprocessor available form MIPS; a QWERTY keyboard; a 480× 240×2 bit-per-pixel liquid crystal display (LCD) touch screen using, for example, a stylus; input/output ports, including, for example, a serial port, a docking port for interfacing with other computers such as desktop PCs, and an IrDA-standard infrared sensor; about 4 megabits (MB) of read only memory (ROM); and about 2 MB of random access memory (RAM); with application programs operating using the "WINDOWS CE" operating system available from "MICROSOFT" Corporation.

As shown in the illustrative embodiment in FIG. 8, the pad device 80 provides a keypad 82, a GUI 84 including a display, and a speaker 86 which function as described above for the badge unit 54 shown in FIGS. 3–7. The sensor/transmitter 88 may incorporate an IrDA standard infrared sensor, and may include a separate infrared transmitter for interfacing with the infrared transceiver 22, 42 shown in FIGS. 1–2, respectively. Alternatively, as shown in FIG. 8, the sensor/transmitter 88 may be permanently or removably attached to the housing 90 of the pad device 80 and connected to, for example, an input port 92 by a connection 94.

Figure 4:
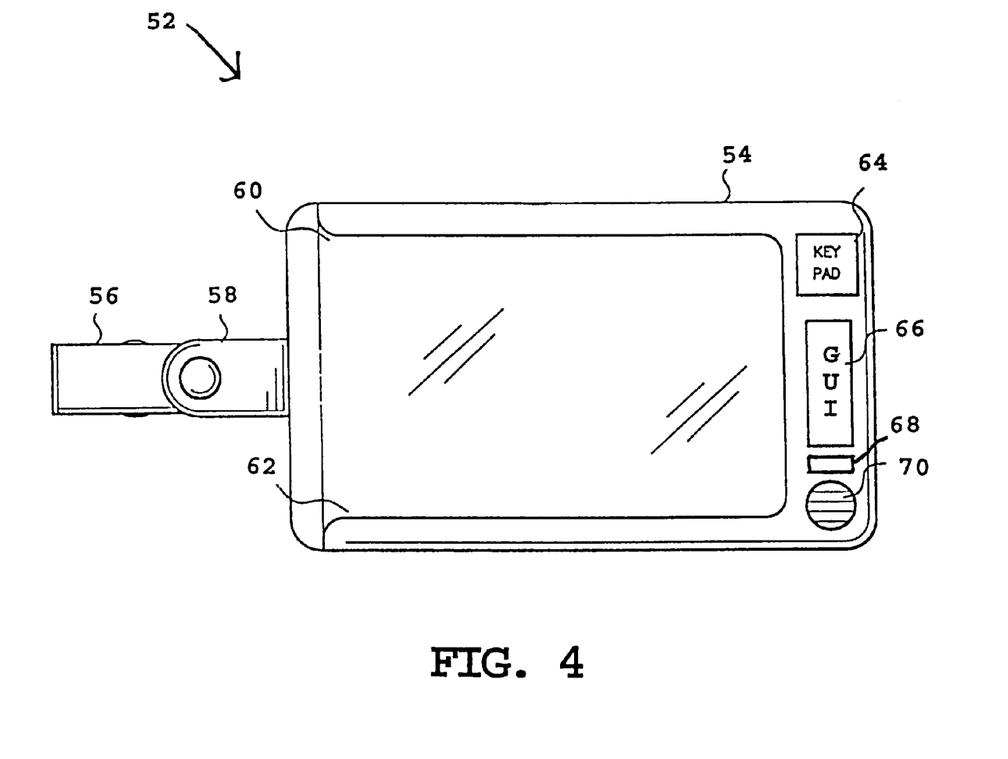
FIG. 4 illustrates a top plan view of the housing of the badge unit according to the present invention.

Each of the set of portable computing devices 34, 36 includes an input device, a display, and a processor or microcontroller for generating and interacting with a GUI provided on the display, such as GUIs 66, 84 shown in FIGS. 4 and 8, and for processing user inputs from the input device, including user inputs corresponding to the scheduling information of each telephone user. Each of the set of portable computing devices 34, 36 also includes a memory for storing a GUI-based scheduling program, such as "SCHEDULE+" for "WINDOWS", available from "MICROSOFT"; and the processor, operating with the input device and the display, executes the GUI-based scheduling program for interactively processing the scheduling information with the scheduling unit.

Using the GUI-based scheduling program, the scheduling unit 14 processes the user schedule information for each of the plurality of users to perform individual user scheduling and/or group scheduling between a portion of the plurality of users.

In operation, the telephone communication system shown in FIGS. 1–2 establishes a communication link between a calling telephone and a telephone determined by the locator system as closest to the location of the called person. The communication link may be established upon entry of a connection command from the calling telephone after communication of the location information to the calling telephone.

The telephone communication system may include a DO-NOT-DISTURB function in conjunction with the schedule notification message communications function, in which a user inputs a code representing the DO-NOT-DISTURB function selectable by the first user at one of the plurality of telephones assigned to the first user. The DO-NOT-DISTURB function is activated by entering the code for instructing the PBX to not establish a communication link with another telephone to prevent communication of the schedule notification message, even if the locator system has determined the location of the first user at the one of the telephones assigned to the first user.

The telephone communication system may also include a paging system (not shown in FIGS. 1–2) having a plurality of speakers for broadcasting the schedule notification message over at least one of the speakers, wherein the paging system is connected to the PBX 10 and is activated by a selection of a preassigned code from one of the telephones.

The locator system of the telephone communication system may also include means for grouping each of the users into one of a plurality of groups, and the locator system includes means for locating all users belonging in a selected one of the groups for communicating the schedule notification message to the selected one of the groups, and display means for displaying the locations of all users in the selected group.

Each of the set of portable units 34, 36 includes means for housing a card having stored information including scheduling information associated the respective user of the respective portable unit, and means for retrieving the stored information from the card and transferring the scheduling information to the scheduling unit.

The disclosed telephone communication system may also provide a RING-WHEN-ALONE function in which the user inputs a code representing selection of the RING-WHEN-ALONE function. Upon activation from one of the telephones, the disclosed telephone communication system rings a selected telephone only when, during communication of the schedule notification message, the locator system determines that there is no more than one person at the location thereof.

METHOD OF OPERATION

Figure 9:
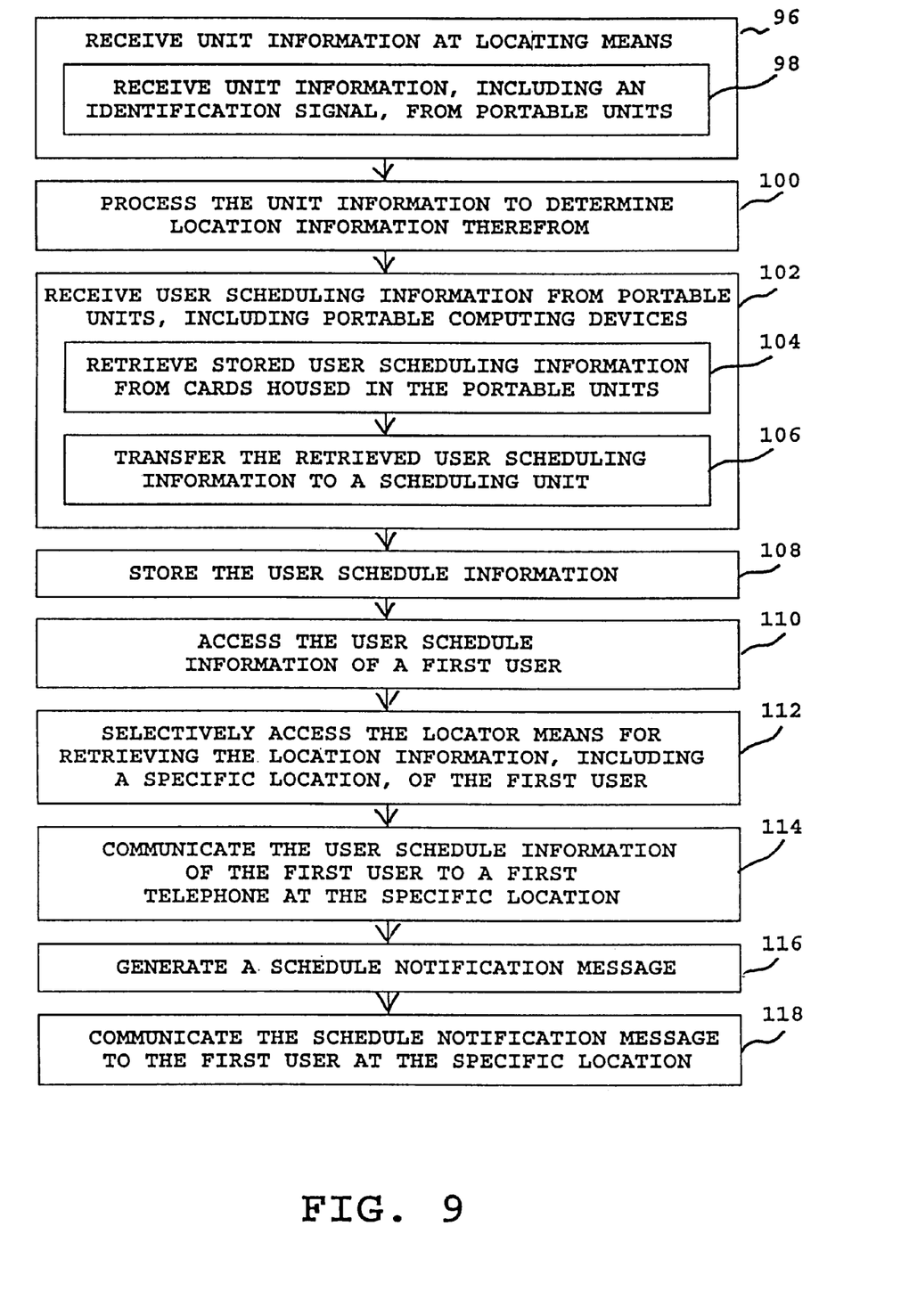
FIG. 9 is a flowchart of the operation of the present invention.

As shown in FIG. 9, the telephone communication system operates according to the disclosed method, in which the telephone communication system receives unit information at the locating system in step 96 by, for example, receiving unit information, including an identification signal, from portable units 34, 36. The PBX 10 then processes the unit information in step 100 to determine location information therefrom to identify each user by the location of their associated portable unit, and to located the identified user.

The method then receives user scheduling information from the portable units 34, 36 in step 102, including receiving such scheduling information from any portable computing devices such as the pad 36. The step 102 of receiving user scheduling information may include the step of retrieving stored user scheduling information in step 104 from cards housed in the portable units 34, 36, such as a function card 72 positioned in and coupled to a badge unit 52, as shown in FIG. 7.

After retrieving such user scheduling information from function card 72, the PBX 10 then transfers the retrieved user scheduling information to the scheduling unit 14 in step 106. The method then stores the user schedule information in the scheduling database 16 in step 108.

In response to commands, for example, from a user or commands generated by the scheduling unit 14 in response to a scheduled meeting time being attained, the method then accesses the user schedule information of a first user in step 110; and selectively accesses the locator system to retrieve the location information, including a specific location, of the first user in step 112. Accordingly, at an appropriate time, the user schedule information triggers the locator system and the PBX 10 to locate and call the first user to provide a schedule notification message thereto.

The method then establishes a communications path to the first user to communicate the user schedule information of the first user to a first telephone at the specific location in step 114. For example, referring to FIG. 1, to send user schedule information to the user 30, the PBX 10 generates a telephone signal to activate the telephone 26. The method may also include the step of determining the closest telephone to the user 30 to establish the communication path. Such a step of determining a closest telephone is described, for example, in U.S. Appln. No. 08/586,557, incorporated herein.

Upon establishing the communication path and communicating the user schedule information, the method may also generate a schedule notification message in step 116 to be output to the user 30; for example, a visually displayed message through the GUI 66 of the badge unit 52, and/or an audible message through the speaker 70 of the badge unit 52 or through the telephone 26. Alternatively, the schedule notification message may be a pre-recorded message and/or a computer-generated message generated by voice generation software using pre-stored phonetics data for generating a customized schedule notification message corresponding to the stored schedule information associated with the user to be notified.

The pre-recorded message and/or computer-generated message may be audibly output through the speaker of, for example, the telephone 26, or the speaker 70 of, for example, the badge unit 52. For example, referring to FIG. 11, the schedule information with data for a 10:30 A.M. meeting may be used by the scheduling unit 14 to cause the generation of sounds corresponding to "YOU HAVE A 10:30 MEETING WITH DARLENE RUDD AND TED OMAN", which is output to the appropriate user by a default or pre-selected audio output device as described above. The audibly generated schedule notification message may be generated and output in conjunction with the visual display of a text version of the schedule notification message, such as the message 148 shown in FIG. 11.

The method communicates the schedule notification message to the first user at the specific location in step 118, through, for example, a closest telephone determined to be closest to the first user, as described above.

The disclosed telephone communication system and method may perform other telephone functions, with examples of such telephone functions described in U.S. Appln. No. 08/586,557, incorporated herein. The disclosed telephone communication system and method perform such telephone functions in conjunction with the schedule information of the users.

Figure 10:
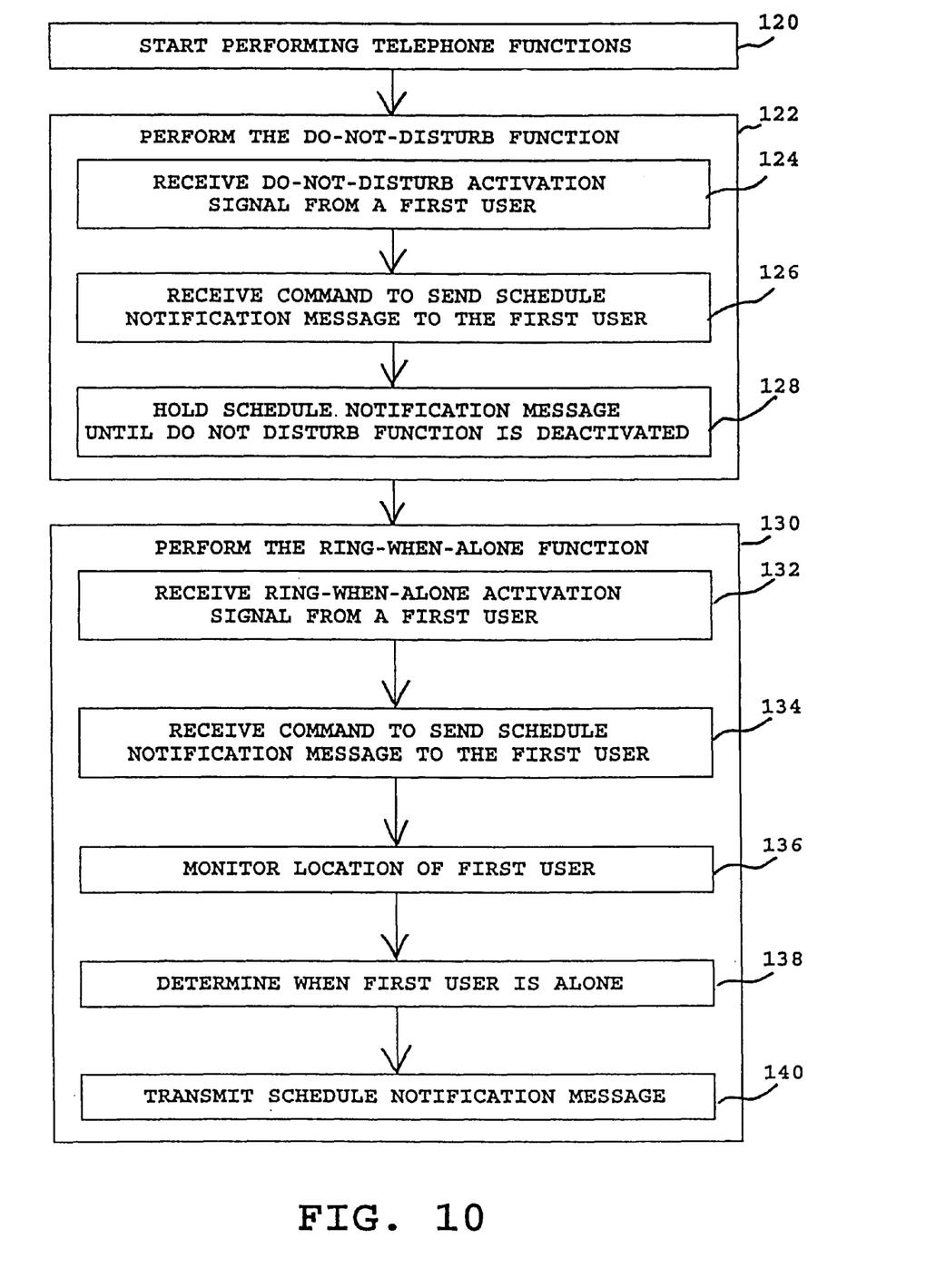
FIG. 10 is a flowchart of the operation of telephone functions by the present invention.

As shown in FIG. 10, the method starts performing telephone functions in step 120; for example, the method performs a DO-NOT-DISTURB function in step 122, which includes the step of receiving a DO-NOT-DISTURB activation signal from a first user in step 124, such as a code input, for example, through a telephone 26, through a function card 72 in a badge unit 52 in FIG. 7, or through a pad 36 such as the pad device 80 in FIG. 8. Upon receiving a command or instruction in step 126, for example, from the scheduling unit 14 to send a schedule notification message to the first user, the PBX 10 responds to the received DO-NOT-DISTURB activation signal to hold the schedule notification message in step 128, for example, in a queue, until the DO-NOT-DISTURB function is deactivated by the user or other circumstances, such as by a supervisor.

The method also perform a RING-WHEN-ALONE function in step 130 upon receiving a RING-WHEN-ALONE activation signal from a first user such as a code input, for example, through a telephone 26, through a function card 72 in a badge unit 52 in FIG. 7, or through a pad 36 such as the pad device 80 in FIG. 8. Upon receiving a command or instruction in step 134, for example, from the scheduling unit 14 to send a schedule notification message to the first user, the PBX 10 responds to the RING-WHEN-ALONE activation signal by monitoring the current location of the first user in step 136 by accessing the locator system.

The PBX 10 detects the condition of the first user being alone using methods described, for example, in U.S. Appln. No. 08/586,557, incorporated herein; for example, by counting the number of portable units 34, 36, including the portable unit of the first user, which are within a predetermined distance from a closest transceiver relative to the first user.

Upon determining when first user is alone or relatively alone in step 138, the method then has the PBX 10 transmit the schedule notification message to the first user in step 140.

The disclosed telephone communication system and method implements individual and/or group scheduling using, for example, "SCHEDULE+" from "MICROSOFT". For example, each portable unit 34, 36 as well as the PC 48 is equipped with a GUI as described above for providing scheduling screens, such as the schedule screen 142 with user-actuatable icons shown in FIG. 11. In the illustrative embodiment shown in FIG. 11, the schedule screen 142 provides a plurality of user-actuatable icons 144 with the appearance of having tab-like overlapping shapes, allowing the user to access different user-input windows.

Figure 11:
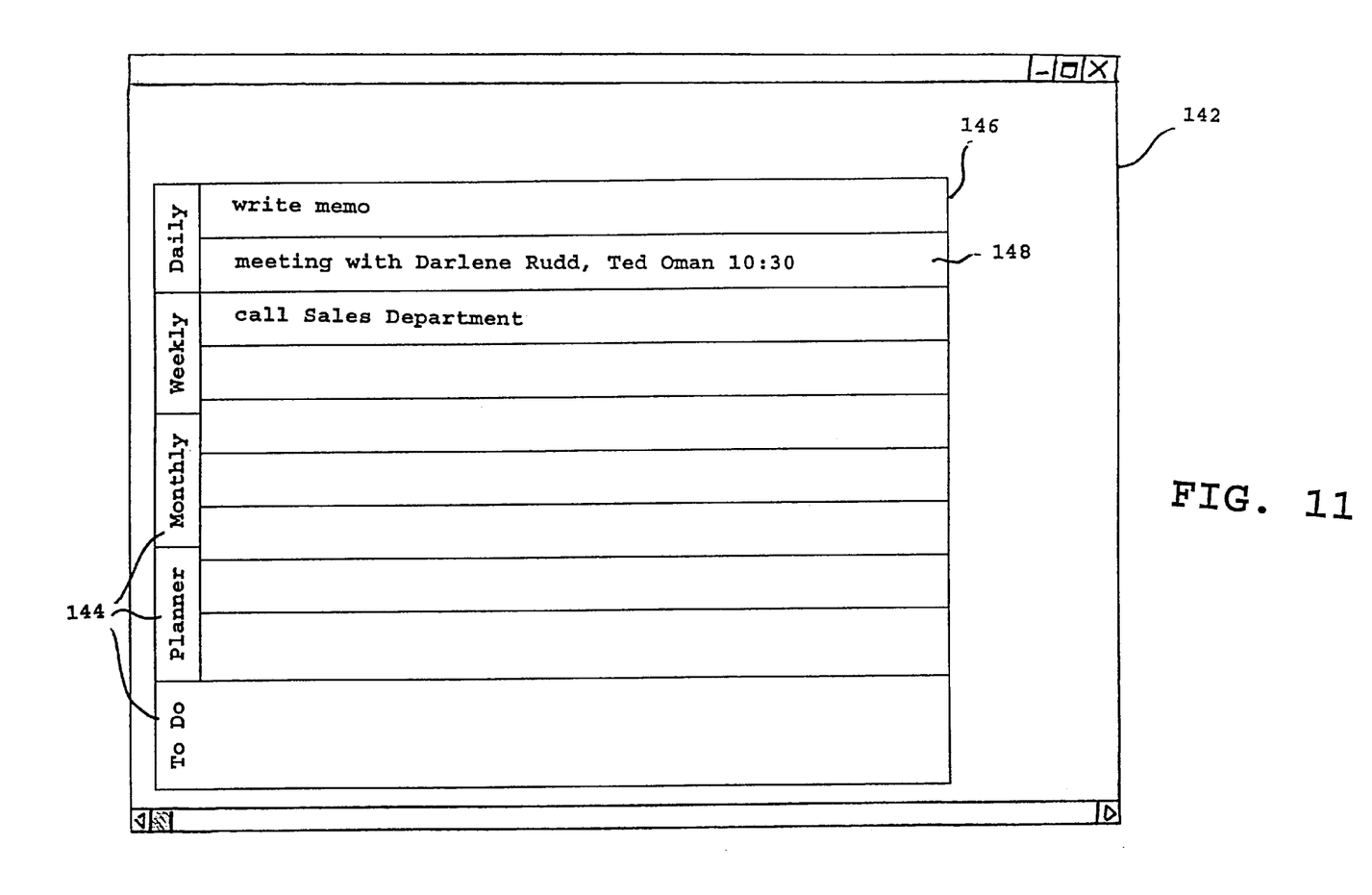
FIG. 11 illustrates a schedule screen of the present invention.

As shown in FIG. 11, one such user-input window is a TO DO window having a screen region 146 for a receiving and displaying a plurality of portions of text as tasks to be performed by the user. One such task 148 indicates a meeting with other individuals at a specific time.

In use, the disclosed telephone communication system and method receives the input text such as the task 148 as user schedule information through, for example, the transceivers 18–22 and 38–42, as in step 102 of FIG. 9, and stores such user schedule information in the scheduling database 16, as in step 108 in FIG. 9.

For individual scheduling, the scheduling unit 14 may access all stored user schedule information stored in the scheduling database 16, as in step 110 in FIG. 9, to determine if any user schedule information warrants the generation of a schedule notification message. For example, when a clock internal to the scheduling unit 14 attains the time of about 10:30 a.m., the task 148 indicating a 10:30 a.m. meeting for the user causes the steps 112–118 of FIG. 9 to be performed to notify the user of the scheduled meeting.

Figure 12:
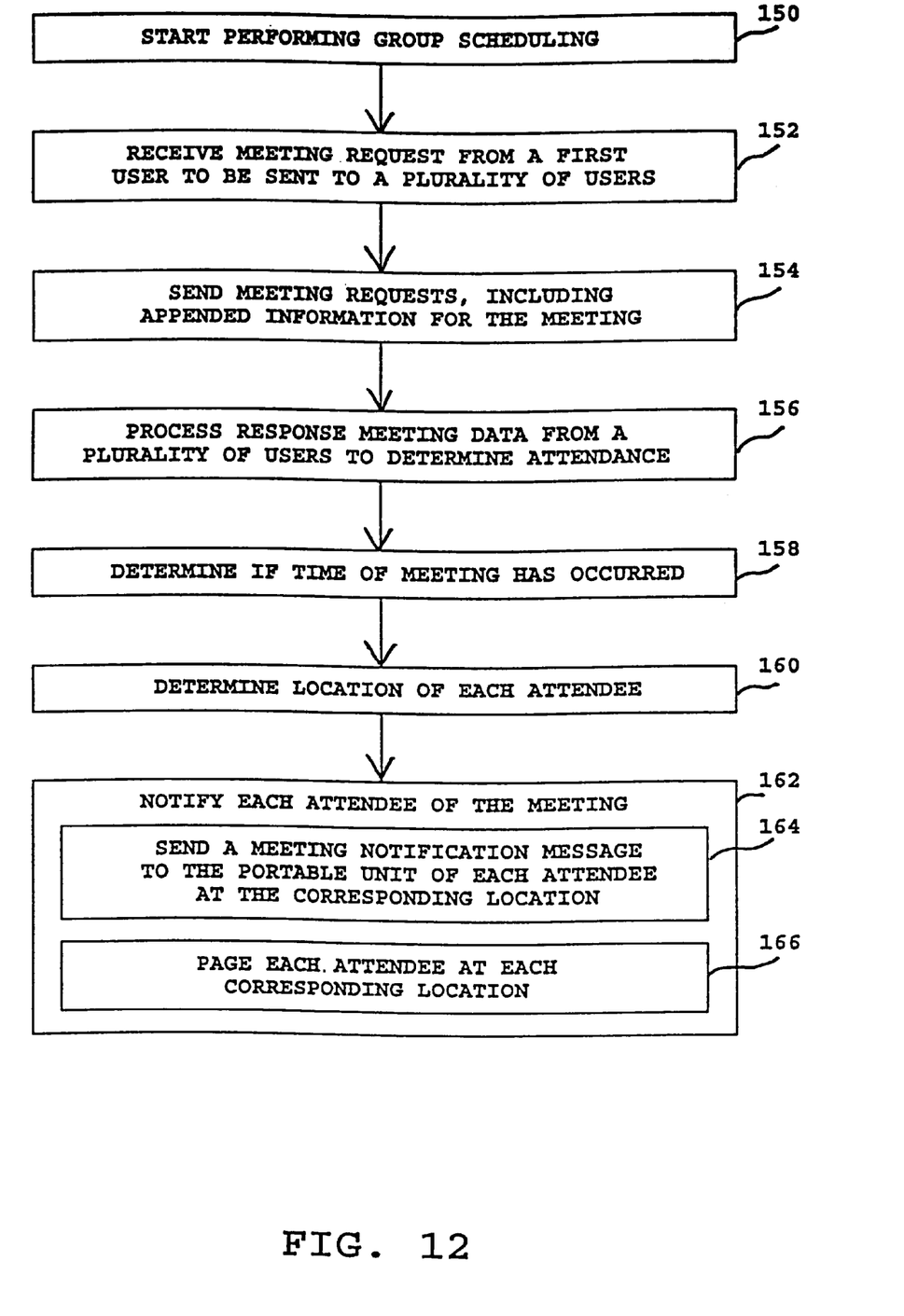
FIG. 12 is a flowchart of the operation of group scheduling by the present invention.

For scheduling, coordinating, and notifying groups of users, the disclosed telephone communication system and method starts performing group scheduling in step 150, receives a meeting request at the scheduling unit 14 in step 152 from a first user to be sent to group of specified users or even to all users for a general meeting. The scheduling unit 14 then sends the meeting requests, including any appended information pertinent to the meeting such as an agenda, to the specified users in step 154.

The specified users may then indicate, through their portable units 34, 36, their availability and/or intention to attend the meeting by generating response data as user schedule information to be sent to the scheduling unit 14. The scheduling unit 14 processes the user schedule information, including the response data, to determine attendance for the meeting in step 156. The first user requesting the meeting, or alternatively any user, may access the user schedule information of each person in the requested group, which may then be displayed by the portable unit of each respective user in a group scheduling screen.

Figure 13:
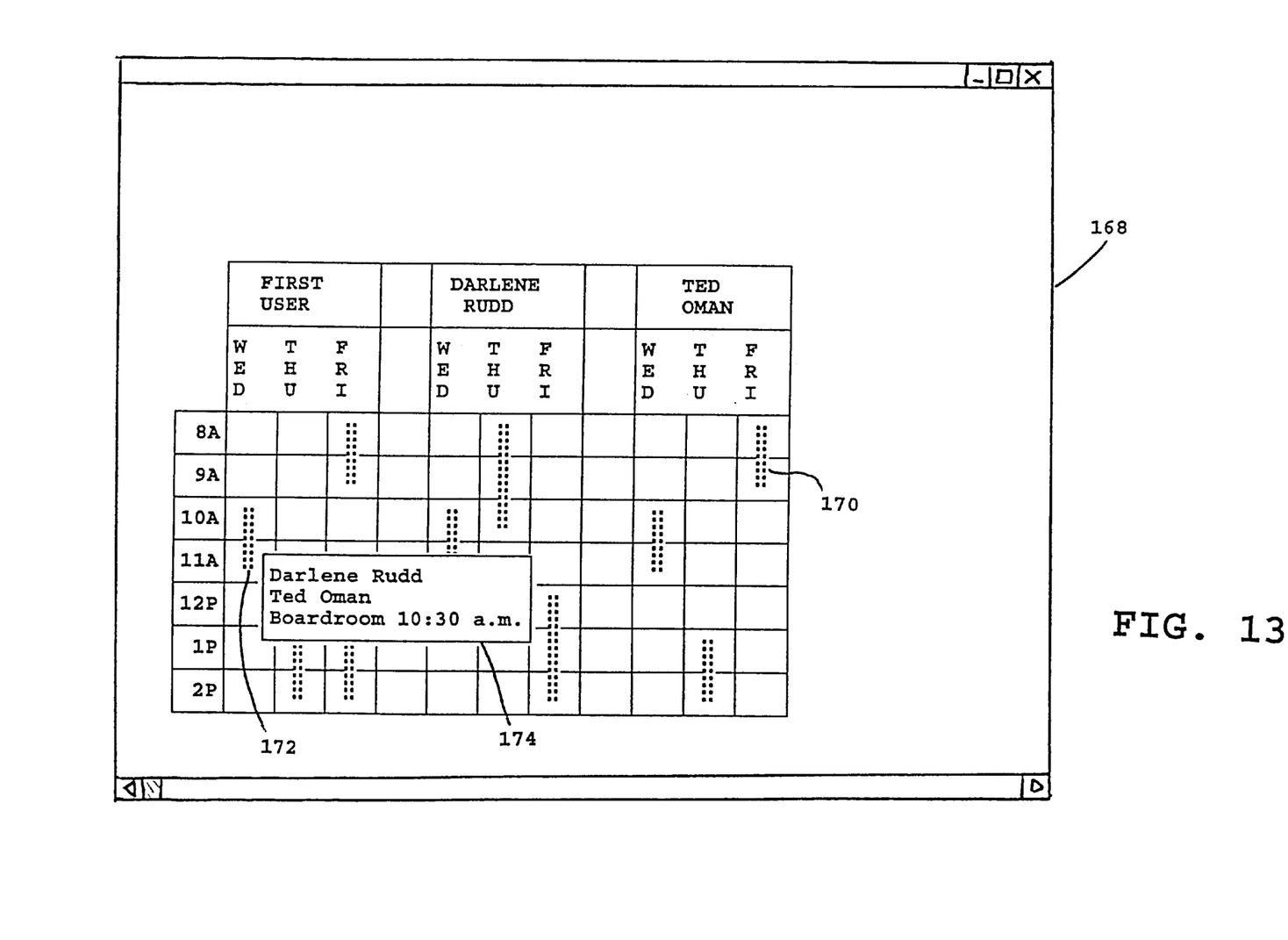
FIG. 13 illustrates a group schedule screen of the present invention.

An illustrative group scheduling screen 168 displayed on a GUI is shown in FIG. 13, in which times for meetings or other tasks, such as business trips and unavailability, are shown on a grid as bars 170, 172 occupying the corresponding times. If a user chooses to see more information about the occupied times, the user may click on the bar or touch the bar on the screen with a finger or stylus, and a highlight box is displayed, providing additional information. For example, if a user touches the bar 170, the highlight box 174 is generated substantially adjacent to the bar 170, indicating, for example, attendees, location, and time of a meeting therewith.

It is understood that, as additional user schedule information is input by users, the disclosed telephone communication system and method, through the PBX 10 and the scheduling unit 44, updates the user schedule information stored in the schedule database 16, and so the displayed group scheduling screen 168 may be dynamically updated during display to a user.

For every task 148 in which a meeting is indicated, the scheduling unit 14 determines in step 158 if the time of the meeting has occurred or is soon to occur within a predetermined time, such as 15 minutes. When the time of the meeting is attained or soon to be attained, the disclosed telephone communication system and method, using the PBX 10, accesses the locator system to determine the current location of each attendee of the meeting in step 160, and then notifies each attendee of the meeting in step 162 by, for example, sending a meeting notification message to each attendee in step 162 through the closest telephone thereto or through the respective portable unit thereof. Alternatively or supplementary to step 162, the method may page each attendee at each corresponding location as in step 166 using a paging system.

In an alternative embodiment, upon activation by a user of the DO-NOT-DISTURB and/or RING-WHEN-ALONE functions, as described above, may override the conjunction of such meeting notification messages to the user. In another alternative embodiment, the disclosed telephone communication system and method may be set by a supervisor to ignore such DO-NOT-DISTURB and/or RING-WHEN-ALONE functions activated by the user, under specified circumstances, such as the notification of a group meeting.

It will be understood that various modifications can be made to the embodiments of the present invention herein disclosed without departing from the spirit and scope thereof. For example, various modifications may be made in the communication formats utilized to transmit data. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. A scheduling and communication system, comprising:
   (a) at least one communication device for communication between said system and a user;
   (b) a scheduling unit for storing user schedule information;
   (c) a locator system connected to the scheduling unit, the locator system including:
      a portable badge associated with the user for transmitting user information including an identification of the user; and
      a plurality of transceivers, each adapted for receiving the user information transmitted from the portable badge and for electrically forwarding at least a portion of the user information to a processing unit to determine location information of the user;
   (d) schedule notification means for accessing the user schedule information of the user, for retrieving location information including a specific location associated with the user, and for generating a schedule notification signal for communication to the user at the specific location thereof; and
   (e) means for selectively activating the at least one communication device for use in conjunction with the location information for communicating with the user.

2. The scheduling and communication system according to claim 1, further comprising:

a plurality of paging devices each being associated with a specific user; and transmitting means connected to said at least one communication device for wirelessly transmitting a paging signal to at least one of said plurality of paging devices, said paging signal providing the user with said schedule notification signal and facilitating said locating system in locating the user.

3. The scheduling and communication system according to claim 1, wherein the portable badge further comprises:

an input device;

a display; and a processor for generating a graphic user interface (GUI) on the display and for processing user inputs from the input device, including user inputs corresponding to the scheduling information of each telephone user.

4. The scheduling and communication system according to claim 3, wherein each portable badge includes:

a memory for storing a GUI-based scheduling program; and the processor, operating with the input device and the display, executes the GUI-based scheduling program for interactively processing the scheduling information with the scheduling unit.

5. The scheduling and communication system according to claim 4, wherein the scheduling unit processes the user schedule information for each of the plurality of users to perform group scheduling between a portion of the plurality of users.

6. The scheduling and communication system according to claim 1, wherein a communication link between a calling telephone and a telephone determined by the locator system as closest to the location of the called person is established upon entry of a connection command from the calling telephone after communication of location information to the calling telephone.

7. The scheduling and communication system according to claim 1, wherein said at least one communication device further comprises a plurality of telephones having a plurality of telephone functions, one of said telephone functions including a code representing a do-not-disturb function selectable by the user at one of the plurality of telephones assigned to first user by entering the code for instructing the at least one communication device to not establish a communication link with another telephone to prevent communication of the schedule notification signal upon determination of the location of the user by the locator system at the user assigned telephone.

8. The scheduling and communication system according to claim 7, wherein a second of said telephone functions includes a code representing a ring-when-alone function for activation from one of the telephones for ringing the selected telephone only when, during communication of the schedule notification signal, the locator system determines that there is no more than one person at the location thereof.

9. The telephone communication system according to claim 1, further including a paging system having a plurality of speakers for broadcasting the schedule notification message over at least one of the speakers, wherein the paging system is connected to the at least one communication device and is activated by a selection of a preassigned code from one of a plurality of telephones connected to the at least one communication device.

10. The scheduling and communication system according to claim 1, wherein the locator system includes means for grouping each of the users into one of a plurality of groups and means for locating all users belonging in a selected one of the groups for communicating the schedule notification message to the selected one of the groups, and display means for displaying the locations of all users in the selected group.

11. The scheduling and communication system according to claim 1, wherein each of the portable badge includes means for housing a card having stored information including scheduling information associated the respective user of the respective portable badge, and means for retrieving the stored information from the card and transferring the scheduling information to the scheduling unit.

12. A scheduling system for coordinating scheduling between a plurality of users, comprising:

(a) communication means for facilitating communication between a plurality of users;

(b) a scheduling unit for storing user schedule information for each of the plurality of users;

(c) locator means connected to the communication means for providing location information, the locator means including:

a set of portable units each associated with a respective one of a plurality of users and transmits unit information including an identification signal for identifying the user associated with the respective unit, the set of portable units including a set of portable computing devices operating a scheduling program and a graphic user interface (GUI) for interactively processing scheduling information with the scheduling unit; and a plurality of transceivers, each operatively connected to the communication means and each adapted for receiving the unit information transmitted from the set of portable units and for electrically forwarding at least a portion of the unit information to the communication means to determine location information of the users;

and (d) schedule notification means for accessing the user schedule information of a first user, for retrieving location information including a specific location associated with the first user using the locator means, and for generating a schedule notification message for communication to the first user at the specific location thereof.

13. The scheduling system according to claim 12, further comprising:

a plurality of paging devices each being associated with a specific user; and transmitting means connected to said at least one communication device for wirelessly transmitting a paging signal to one of said plurality of paging devices, said paging signal providing the user with said schedule notification signal and facilitating said locating system in locating the user.

14. The scheduling system according to claim 12, wherein each of the set of portable computing devices includes:

a memory for storing the scheduling program, wherein the scheduling program is GUI-based; and a processor, operating with an input device and a display, for executing the GUI-based scheduling program for interactively processing the scheduling information with the scheduling unit.

15. The scheduling system according to claim 12, wherein each of the set of portable units includes means for housing a card having stored information including scheduling information associated the respective user of the respective portable unit, and means for retrieving the stored information from the card and transferring the scheduling information to the scheduling unit.

16. The scheduling system according to claim 12 wherein the scheduling program is "SCHEDULE+", a GUI-based scheduling application program for providing individual and group scheduling functions.

17. The scheduling system according to claim 12 wherein each of the set of portable units includes "WINDOW CE", an operating system adapted for handheld computing devices.

18. A method for facilitating scheduling among a plurality of users comprising the steps of:

receiving unit information at locating means;

processing the unit information to determine location information associated with respective users;

receiving user schedule information at a scheduling unit from a set of portable computing devices associated with respective users;

storing the user schedule information for each of the users;

accessing the user schedule information of a first user;

selectively accessing the locator means for retrieving the location information including a specific location associated with the first user;

communicating the user schedule information of the first user to a first telephone of a plurality of telephones at a specific location determined by the corresponding location information of the first user; and generating a schedule notification message; and communicating the schedule notification message to the first user at the specific location thereof.

19. The method of claim 18 wherein the step of receiving user schedule information at the scheduling unit includes the steps of:

receiving unit information from the set of portable units, wherein the unit information includes an identification signal for identifying the user associated with the respective unit;

receiving the user scheduling information from the set of portable computing devices.

20. The method of claim 18 further comprising the step of:

processing the user schedule information for each of the plurality of users to perform group scheduling between a portion of the plurality of users.

21. The method of claim 18 further comprising the steps of:

receiving a selected preassigned code; and broadcasting, in response to the selected preassigned code, the schedule notification message over at least one of a plurality of speakers in a paging system.

22. The method of claim 18 wherein the step of receiving the scheduling information includes the step of:

retrieving stored user scheduling information from a card housing in one of the set of portable units; and transferring the retrieved user scheduling information to the scheduling unit.

* * * * *